United States Patent
Satapathy et al.

(10) Patent No.: US 7,260,654 B1
(45) Date of Patent: Aug. 21, 2007

(54) SYSTEM AND METHOD FOR COMMUNICATING USING MULTIPLE ACCESS TECHNOLOGIES AND MULTIPLE STANDARDS

(75) Inventors: Durga P. Satapathy, Olathe, KS (US); John W. Linebarger, Charlotte, NC (US); Thomas F. Brown, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 676 days.

(21) Appl. No.: 10/047,327

(22) Filed: Jan. 14, 2002

(51) Int. Cl.
*G06F 15/16* (2006.01)
*H04N 7/18* (2006.01)
*H04L 12/28* (2006.01)
*H04L 12/26* (2006.01)

(52) U.S. Cl. ............ 709/250; 709/249; 709/228; 725/74; 370/401; 370/252

(58) Field of Classification Search ........ 709/230, 709/236, 250; 710/30, 65; 370/395.5, 464–469, 370/351–354
See application file for complete search history.

(56) References Cited

U.S. PATENT DOCUMENTS

| | | | |
|---|---|---|---|
| 5,321,819 A * | 6/1994 | Szczepanek | 709/228 |
| 5,881,142 A | 3/1999 | Frankel et al. | |
| 5,963,620 A | 10/1999 | Frankel et al. | |
| 6,075,784 A | 6/2000 | Frankel et al. | |
| 6,141,339 A | 10/2000 | Kaplan et al. | |
| 6,141,356 A * | 10/2000 | Gorman | 370/493 |
| 6,272,553 B2 * | 8/2001 | Way et al. | 709/250 |
| 6,343,079 B1 | 1/2002 | Way et al. | |
| 6,385,203 B2 * | 5/2002 | McHale et al. | 370/401 |
| 6,512,817 B1 | 1/2003 | Dale et al. | |
| 6,526,581 B1 * | 2/2003 | Edson | 725/74 |
| 6,618,384 B1 * | 9/2003 | Elliott | 370/396 |
| 6,640,195 B1 | 10/2003 | Bayerl et al. | |

* cited by examiner

*Primary Examiner*—Wen-Tai Lin

(57) ABSTRACT

A communication system and method enable the dynamic use of multiple access technologies and multiple standards using a software functionality approach. An access device configured to communicate dynamically using multiple access technologies and multiple standards has a network interface, a central core, and a service hub with a premises interface. The network interface is configured to transmit communications to, and/or receive communications from, a network using multiple network access technologies. The service hub with the premises interface is configured to transmit communications to, and/or receive communications from, a premises device using multiple premises access technologies. The central core is configured to format communications received or to be transmitted for multiple access technologies and multiple standards and to control the interface from which the communication will be transmitted.

16 Claims, 1 Drawing Sheet

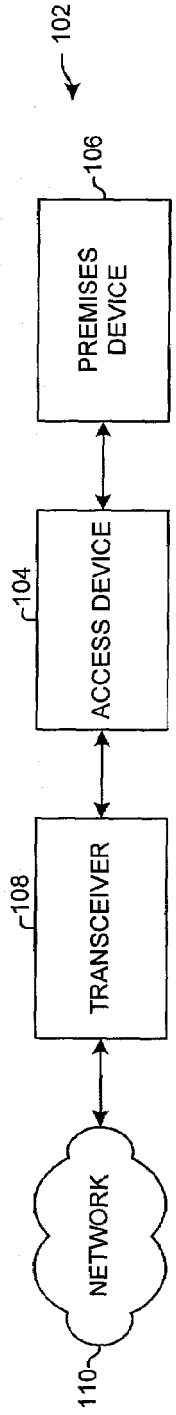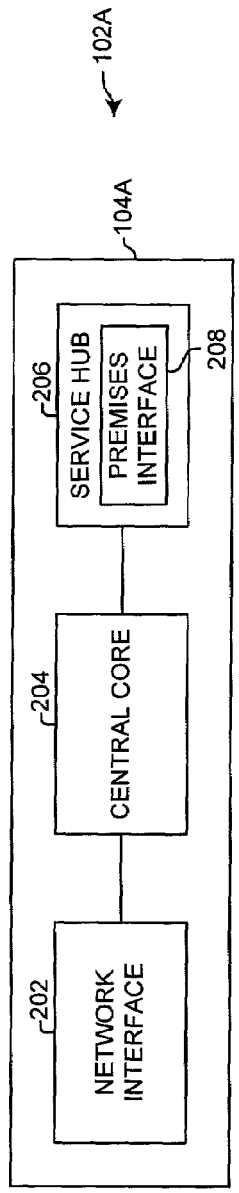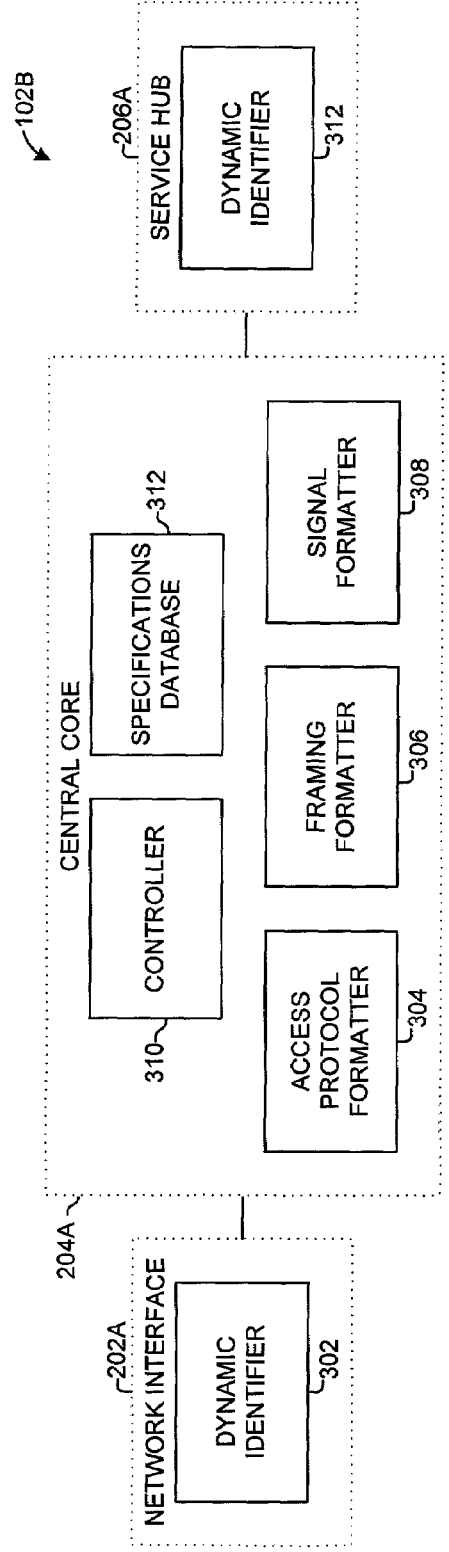

SYSTEM AND METHOD FOR COMMUNICATING USING MULTIPLE ACCESS TECHNOLOGIES AND MULTIPLE STANDARDS

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of communication systems and methods using multiple access technologies.

BACKGROUND OF THE INVENTION

Current access devices in communication systems typically are configured to access a communication system or network using a single access technology, such as only asymmetric digital subscriber line (ADSL) technologies for access to a network and services. Other technologies and protocols are used. However, typically only a single access technology is selected for the access device. Thus, an access device is needed for use in a communication system that can communicate using multiple access technologies, both for network access and for premises access.

Furthermore, the standards used for novel access technologies are constantly being updated, and the onus of supporting equipment that complies with multiple standards essentially falls upon the service provider. Thus, an access device is needed that can be configured to support one or more multiple access technology standards. Such access devices are especially useful for service provider networks that are designed to provide a convergence of traditionally separate services, such as voice and data services. One such network is an integrated on-demand network (ION), an example of which is discussed in U.S. patent application Ser. No. 08/826,641, filed Apr. 4, 1997, now U.S. Pat. No. 6,141,339, entitled Telecommunications System, the entire contents of which are incorporated herein by reference. The ION system is a single service architecture that enables customers to obtain a full range of local and long distance voice, data, video, and internet services and benefit from consolidated access through a single provider. The ION system uses an access device, such as an integrated services hub (ISH), that uses a single access technology, such as a leased line or an xDSL line. One such ISH is described in U.S. patent application Ser. No. 09/226,575, filed Jan. 7, 1999, now U.S. Pat. No. 6,272,553, entitled Multi-Services Communications Device, the entire contents of which are incorporated herein by reference. The ISH is a highly-modular, standalone system with plain old telephone service POTS and Ethernet or digital service level 1 (DS1) interfaces on the premises side and xDSL or leased line interfaces on the network side.

SUMMARY OF THE INVENTION

The present invention is directed to a system for accessing a plurality of access technologies. The system comprises a transceiver configured to communicate via a network protocol and a premises device configured to communicate via a premises protocol. An access device is configured to communicate with the transceiver and the premises device using the plurality of access technologies to receive a communication, to dynamically determine an access technology type for the communication from among the plurality of access technologies, to reformat the communication for another access technology type, and to transmit the communication.

The present invention also is directed to a system for accessing a plurality of access technologies. The system comprises a network interface configured for network access and a service hub configured for premises device access. A central core is configured to communicate using a plurality of access technologies, to process a communication for a first one of the access technologies, to select a port from the network interface or the service hub, and to generate the communication for transmission from the port.

The present invention further is directed to a system for accessing a plurality of access technologies. The system comprises a specifications database configured to store specifications for the plurality of access technologies, each specification comprising at least one member of a group comprising an access protocol format, a framing format, and a signal format. A controller is configured to retrieve a selected specification for a selected access technology from the specifications database, to process the selected specification to identify formatting for the communication, and to generate at least one control signal identifying the formatting for the communication. An access protocol formatter is configured to format the communication for the access protocol format when instructed by the controller via the control signal. A framing formatter is configured to format the communication for the framing format when instructed by the controller via the control signal. A signal formatter is configured to format the communication for the signal format when instructed by the controller via the control signal.

Further, the present invention is directed to a method for accessing a plurality of access technologies. The method comprises communicating with a transceiver and a premises device using the plurality of access technologies. The method further comprises receiving a communication and dynamically determining an access technology type for the communication from among the plurality of access technologies. The communication is reformatted for another access technology type and transmitted.

Further still, the present invention is directed to a method for accessing a plurality of access technologies. The method comprises configuring a network interface for network access and configuring a service hub for premises device access. The method further comprises communicating using a plurality of access technologies. A communication is processed at a central core for a first one of the access technologies, and a port is selected from the network interface or the service hub. The communication is generated for transmission from the port.

Further yet, the present invention is directed to a method for accessing a plurality of access technologies. The method comprises storing specifications for the plurality of access technologies, each specification comprising at least one member of a group comprising an access protocol format, a framing format, and a signal format. A selected specification is retrieved for a selected access technology. The selected specification is processed to identify formatting for a communication. At least one control signal is generated identifying the formatting for the communication. The communication is formatted for the access protocol format when instructed by the control signal. The communication is formatted for the framing format when instructed by the control signal. The communication is formatted for the signal format when instructed by the control signal.

BRIEF DESCRIPTION OF THE DRAWINGS

FIG. 1 is a block diagram of a communication system in accordance with an embodiment of the present invention.

FIG. 2 is a block diagram of a communication system having an expanded access device in accordance with an embodiment of the present invention.

FIG. 3 is a block diagram of a communication system having an expanded access device in accordance with an embodiment of the present invention.

DETAILED DESCRIPTION

Access technologies and standards for access technologies constantly are changing and being developed. Thus, access devices for communication systems typically require replacement of hardware or development of new systems to be able to effectively communicate using the changed or new access technologies. As the demand for access to bandwidth grows, and innovative access technologies compete with traditional access technologies, service providers are faced with the tradeoff of reducing time to market versus incorporating novel technologies and costly upgrades to access devices. This issue is further complicated by the fact that standards bodies are constantly updating existing standards or producing new standards for a given access technology, which results in the service providers having to update their networks and access devices to be compliant with new or updated standards.

One embodiment of the present invention uses an integrated software and functionality approach for an access device in place of hardware technologies to minimize the dependence on hardware components and increase the flexibility to use existing, changing, and new access technologies and standards without changing equipment. The systems and methods of the present invention enable a software configuration for which changes can be accomplished remotely. Thus, a change of an access technology or architecture for that technology or an introduction of a new access technology will not require a lift of equipment in the access device. Likewise, an introduction of new standards or updates to existing standards will not require new equipment or costly service calls.

Moreover, for a given access technology, the systems and methods of the present invention enable communication system parameters, such as modulation schemes, transmission rates, protocol settings, and/or other parameters, to be varied dynamically to meet design and/or operating goals, such as optimization of performance in an environment having varying interference levels. The systems and methods provide a platform for service offerings that can be upgraded or otherwise modified dynamically to incorporate new technologies, architectures, and standards.

Also, the present invention results in minimizing inventory and network management costs and requirements, since fewer variations of an access device having various equipment parameters will require support. In addition, since fewer hardware variations are supported, installation efforts can be standardized for the access device, leading to quicker installation times and fewer qualification requirements for the installation technicians.

Furthermore, the ability to support multiple access technologies and related standards in an access device becomes critical in the architecture design of converged network services, which imposes an additional design requirement of supporting multiple services efficiently over a given access network. For instance, a converged network may be designed to efficiently support voice service and data service by formatting the data stream for each service to a common format, such as asynchronous transfer mode (ATM). However, the inherent characteristics of a given service may be better suited to a particular access technology. For example, the signal strength variations in a wireless channel might be acceptable for a mobile voice call, whereas the same is unacceptable for critical data applications that would be better served by a higher quality fiber link. Thus, the existence of an access device that supports multiple access technologies allows a service provider to intelligently map services to access technologies to optimize network efficiency and to provide better service quality.

In one embodiment, the present invention enables the access device to emulate the identity of varying devices with varying access technologies, including protocols and standards. Thus, the access device can be used in various embodiments to communicate as multiple digital subscriber line (xDSL) devices, fiber node devices, and/or cable modem devices using wireless technologies, including satellite links, and wireline technologies.

FIG. 1 depicts an exemplary embodiment of a communication system of the present invention. The communication system 102 of FIG. 1 provides access to multiple access technologies, both from a network side and a premises side. The communication system 102 of FIG. 1 comprises an access device 104, a transceiver 106, and a premises device 108. The transceiver 106 may be configured to communicate via a network 110.

The access device 104 transmits communications to, and receives communications from, the transceiver 106 and/or the premises device 108. The access device 104 is configured for transmission and/or reception of communications via many access technologies. For example, the access device 104 can be configured to communicate with an IP device, an ATM device, a cable modem, an xDSL device, a personal computer, a telephone, and/or other digital devices or analog devices.

In one embodiment, the access device 104 is configured to transmit communications to, and/or receive communications from, the transceiver 106 for access technologies such as xDSL, including asymmetric digital subscriber line (ADSL), single line DSL (SDSL), high bit-rate DSL (HDSL-2), and very high data rate DSL (VDSL), cable television (CATV), multipoint multichannel distribution service (MMDS), local multipoint distribution system (LMDS), personal communication service (PCS), satellite links, internet protocol (IP), asynchronous transfer mode (ATM), optical protocols, other wireless technologies, other wireline technologies, other analog technologies, and/or digital technologies. Thus, the access device 104 is configured to communicate using multiple network access technologies.

In another embodiment, the access device 104 is configured to transmit communications to, and/or receive communications from, the premises device 108 using access technologies such as IP, xDSL, internet protocol (IP), ATM, PCS, plain old telephone service (POTS), ethernet, optical protocols, other wireless technologies, other wireline technologies, other analog technologies, and/or digital technologies. Thus, the access device 104 is configured to communicate using multiple premises access technologies.

The access device 104 can be configured to emulate multiple access technologies, upstream and/or downstream, including signal formats, frame formats, and access protocols. For example, the access device 104 can be configured to emulate multiple signal formats and modulations, such as quadrature amplitude modulation (QAM), quaternary phase shift keying (QPSK), orthogonal frequency division multiplexing (OFDM), carrierless amplitude and phase modulation (CAP), and other modulation and signal formatting.

Moreover, the access device 104 can be configured for multiple frame formats. For example, the access device 104 can be configured to format frames for communications using IP, ATM, high level data link control (HDLC), ethernet, synchronous optical network (SONET), digital signal level zero (DS0), and others.

In addition, the access device 104 can be configured to format multiple access protocols. For example, the access device 104 can be configured to format communications for xDSL, wide area network (WAN), local area network (LAN), code division multiplex access (CDMA), time division multiplex access (TDMA), MMDS, LMDS, PCS, time division duplex (TDD), frequency division duplex (FDD), Bluetooth, and others.

The access device 104 can be configured to dynamically identify a communication and its format. Thus, for example, the access device 104 can be configured to recognize a communication using protocols consistent with MMDS spectrum as well as identifying CDMA communications. The access device 104 is able to process each communication for reception and/or further transmission, using the same or a different protocol or format. Likewise, the access device 104 can be configured to receive a POTS communication or a communication from a set top box, to dynamically identify each communication, and to process each communication for reception and/or further transmission, using the same or a different protocol or format.

In addition, the access device 104 can be configured to apply signal processing to communications. For example, the access device may be configured to code, decode, modulate, demodulate, filter, or apply multimedia processing to a communication. The access device 104 can be configured with other signal processing.

The access device 104 may be configured for wireless access and wireline access. Thus, for example, the access device 104 can be configured for broadband radio frequency (RF) access and broadband wireline access.

The access device 104 may be configured with medium access control (MAC) emulation. The MAC emulation may be proprietary or standardized. For example, the access device 104 may be configured with DOCSIS 1.0 and DOCSIS 1.1/wireless DOCSIS emulation.

The access device 104 may comprise a combination of one or more of a field programmable gate array (FPGA), an application specific integrated circuit (ASIC), and a digital signal processor (DSP) and can be configured via software to emulate a variety of access technologies, modulation schemes, standards, and protocols. The access device 104 provides a variety of interfaces for these access technologies. For example, interfaces may include ADSL, SDSL, HDSL-2, VDSL, CATV, MMDS, LMDS, PCS, and satellite links. Supported protocols and standards may include IEEE 802.11a, IEEE 802.11b, IEEE 802.16, IEEE 802.16a, IEEE 802.16b, IEEE 802.3, ETSI HIPERMAN, Bluetooth, simple workflow access protocol (SWAP), home phoneline networking alliance (HomePNA), data over cable service interface specifications (DOCSIS), and others.

The premises device 106 receives communications from, and/or transmits communications to, the access device 104. The premises device 106 may be, for example, a telephone, a computer, a service hub, a transceiver, a set top box, a cable modem, another modem, an IP device, an ATM device, and/or another analog device and/or digital device configured to transmit communications to, and/or receive communications from, the access device 104.

The transceiver 108 is configured to transmit communications to, and/or receive communications from, the access device 104. The transceiver 108 may be configured as a wireless transceiver and/or a wireline transceiver. Thus, the transceiver 108 may have an antenna for transmission and/or reception of wireless communications. In addition, or alternately, the transceiver 108 may have one or more wireline ports for transmission and/or reception of wireline communications. Thus, the word "transceiver" in terms of the transceiver 108 may be a wireless transceiver and/or a wireline transceiver. The transceiver 108 may communicate using communications for MMDS spectrum, PCS spectrum, LMDS spectrum, CDMA, fiber to the home (FTTH), xDSL, ATM, IP, satellite, and other wireless and/or wireline protocols and formats.

The network 110 is a network configured to carry communications to and/or from the transceiver 108. The network 110 may include hardware, software, or a combination thereof. For example, the network 110 may include wireless switches and/or wireline switches.

The system of FIG. 1 operates as follows. In a first example, the transceiver 108 receives a wireless communication via the network 110. The transceiver 108 transmits the communication to the access device 104.

The access device 104 identifies the communication. In this example, the communication is a CDMA communication. The access device 104 processes the CDMA communication, demodulates the CDMA communication, and processes the header information from the CDMA communication. The access device 104 formats the data from the CDMA communication for another communication to be transmitted to the premises device 106. In this example, the access device 104 reformats the data to a POTS communication and transmits the communication to the premises device 106. It will be appreciated that other wireless and wireline communications using other protocols and formats may be received by the transceiver 108 and the access device 104. In addition, it will be appreciated that the access device 104 can process the received communication for further transmission for wireless or wireline technologies other than a POTS communication.

In another example, the transceiver 108 receives a wireline communication via the network 110. In this example, the wireline communication is an ADSL communication. The transceiver 108 transmits the communication to the access device 104.

The access device 104 receives the communication and dynamically identifies the communication as being an ADSL communication. The access device 104 processes the communication, including the header information and data, and reformats the communication to be transmitted to the premises device 106. In this example, the access device 104 reformats the communication to an ATM communication and transmits the communication to the premises device 106.

In another example, the access device 104 receives a communication from the premises device 106. In this example, the access device dynamically identifies the communication as being an IP communication. The access device 104 processes the communication for transmission from the transceiver 108. In this example, the access device 104 processes the communication for transmission as a CDMA communication, including modulating the communication as a CDMA communication. The access device 104 then transmits the communication to the transceiver 108. The transceiver 108 transmits the communication via the network 110.

In another example, the transceiver 108 receives a wireless communication via the network 110. In this example, the wireless communication is an MMDS communication. The transceiver 108 transmits the communication to the access device 104. The access device 104 receives the communication and dynamically identifies the communication as being an MMDS communication. The access device 104 further identifies the MMDS communication as conforming to the IEEE 802.16a standard. The access device 104 processes the communication, including the header information and data, and reformats the communication to be transmitted to the premises device 106. In this example, the access device 104 reformats the communication to a CDMA communication compliant with the IEEE 802.11b standard and transmits the communication to the premises device 106. It will be appreciated that communications using other standards may be received by the transceiver 108 and the access device 104. In addition, it will be appreciated that the access device 104 can process the received communication for further transmission for wireless or wireline technologies using standards other than a CDMA communication in compliance with the IEEE 802.11b standard.

It will be appreciated that access technologies other than the above examples may be used for receiving or transmitting a communication via the transceiver 108, including multiple access technologies for wireless and/or wireline communications. In addition, it will be appreciated that multiple access technologies can be used to transmit communications to, or receive communications from, a premises device 106 at the access device 104, including wireline technologies and/or wireless technologies.

FIG. 2 depicts an exemplary embodiment of an access device. The access device 104A of FIG. 2 comprises a network interface 202, a central core 204, and a service hub 206.

The network interface 202 provides network access to the access device 104A. Thus, communications are transmitted and received over the network 110 via the network interface 202. The network interface may comprise one or more wireless ports and/or one or more wireline ports. For example, the network interface 202 may include an ADSL port, a port for optical communications, an antenna or connection to an antenna, a radio frequency (RF) tuner, a cable access port such as for a CATV network, a hybrid fiber coax (HFC) network, or other cable accessed network, and/or another type of wireline interface and/or wireless interface.

The network interface 202 is configured to identify the access technology of a communication. The network interface 202 optionally may be configured to provide initial filtering or conversion so that the central core 204 can process the communication. For example, the network interface 202 may be configured with a converter to convert the communication from analog to digital when received and to convert a communication to be transmitted from digital to analog. Moreover, the network interface 202 optionally may be configured with a filter to filter communications, for example, to selectively receive wireless communications within one or more selected spectrums. The network interface 202 may be configured to communicate with an antenna or other receiver or transceiver to direct the transmission or reception of communications. The network interface 202 directs a communication to the appropriate port and transmits the communication from that port.

The central core 204 is configured to process communications for multi-access technologies. The central core 204 can be configured to process communications received from multiple sources or to be transmitted to multiple sources, such as to or from the premises device 108 and/or the network 110. The central core 204 also controls to which port a communication will be transmitted and identifies that port to the network interface 202 or the service hub 206.

The central core 204 can be configured to process a communication to be formatted for a protocol, frame, and/or signal processing. The central core 204 may be configured to process a communication or the data for a communication. The data may include content, such as data representing voice, digital video, or other data, header information from a communication, or other data for, or representative of, a communication. For simplicity, all such communications, data for a communication, data from a communication, or data representative of a communication will be referred to as a communication. One skilled in the art will be able to determine the context within the specification and claims. The central core 204 may comprise an FPGA, an ASIC, and/or a DSP. One or a combination of the three may be used to provide easily configurable software upgrades, speed in processing, and optimal signal processing that can be reconfigured if needed.

The service hub 206 provides access to one or more premises devices via the premises interface 208. The service hub 206 is configured to communicate with the premises device 106 by transmitting communications to, and/or receiving communications from, the premises device using multiple access technologies. The service hub 206 may be configured to support telephony communications, such as by providing dial tone and power to telephones. The service hub 206 also may provide routing functionality for packet based communications and sub-communications, such as for ethernet-based communications, or ATM-based communications.

The service hub 206 has a premises interface 208. The service hub 206 is configured to direct communications to one or more ports in the premises interface 208 or receive communications from one or more ports in the premises interface 208.

The premises interface 208 has the physical interfaces for which multiple access technologies are provided to one or more premises devices. The premises interface 208 may comprise one or more of an RJ11 port, an RJ14 port, an RJ45 port, an ethernet port, a POTS port, an xDSL port, an RF port, an optical port, and/or another wireless and/or wireline port. The premises interface 208 dynamically identifies the access technology of a communication and identifies that access technology for the service hub 206.

The system of FIG. 2 operates as follows. In a first example, a communication is received at the network interface 202. In this example, the network interface 202 determines that the communication is a CDMA communication.

The network interface 202 transmits the CDMA communication and a control signal identifying the communication as a CDMA communication to the central core 204.

The central core 204 demodulates the CDMA communication. In this example, the communication does not require further processing. However, in other examples, de-encryption, decompression, or other processing may be required. The central core 204 transmits the demodulated communication to the service hub 206.

The service hub 206 receives the demodulated communication from the central core 204. The service hub 206 directs the communication to an RJ11 port to be transmitted to a premises device.

In another example, the service hub 206 receives a communication. In this example, the communication is an analog communication transmitted via a POTS connection. The service hub 206 transmits the communication to the central core 204.

The central core 204 converts the communication to a digital form and formats the communication for transfer as an ATM communication. The central core 204 formats the communication as ATM cells, and transmits the ATM cells to the network interface 202.

The network interface 202 receives the ATM cells from the central core 204. The network interface 202 transports the ATM cells over virtual paths (VPs)/virtual channels (VCs).

In another example, the service hub 206 receives a communication from an IP connection. Although the communication is a series of IP packets, for simplicity, we will refer to them as a communication received over an IP connection. The service hub 206 receives the communication via an IP port at the premises interface 208. The service hub 206 transmits the communication to the central core 204.

The central core 204 determines that the communication is to be transmitted via MMDS spectrum. The central core 204 formats the communication for transfer over an MMDS system. The central core 204 transmits the communication to the network interface 202.

The network interface 202 generates the communication to an antenna used for MMDS spectrum. The communication then is transmitted over the MMDS system.

In another example, the network interface 202 receives a communication over an ADSL loop. The network interface 202 identifies the communication as an ADSL communication. The network interface 202 transmits the ADSL communication to the central core 204. In addition, the network interface 202 transmits a message to the central core 204 identifying the communication as an ADSL communication.

The central core 204 strips the header information from the ADSL communication. In this example, the access device 104A is configured to transmit communications to a premises device using microwave communications. The central core 204 formats the communication for transmission via microwave, and transmits the communication to the service hub 206. The central core 204 also transmits a control signal to the service hub 206 identifying microwave as being the access technology with which the communication will be transmitted.

The service hub 206 receives the formatted communication and the control signal. In response, the service hub 206 directs the communication to the antenna for transmission via microwave.

It will be appreciated that the network interface 202 may receive or transmit communications using wireline or wireless technologies. In addition, it will be appreciated that the service hub 206 may receive or transmit communications via wireline or wireless technologies.

In another example, the network interface 202 receives two distinct communications simultaneously. The network interface 202 identifies the first communication as an MMDS communication and the second communication as a UNII band communication. The network interface 202 transmits both communications to the central core 204. In addition, the network interface 202 transmits a message to the central core 204 identifying the first communication as an MMDS communication, and the second communication as a UNII band communication.

The central core 204 identifies the first communication as complying with the IEEE 802.16a standard, and the second communication as complying with the IEEE 802.16b standard. The central core demodulates each communication and processes each in accordance with the specifications of the respective standards. The central core 204 transmits the demodulated and processed communications to the service hub 206. In this example, the access device 104A is configured to transmit communications to a premises device using microwave communications complying with the IEEE 802.11a standard. The central core 204 formats the communication for transmission via microwave in accordance with the specifications of standard IEEE 802.11a, and transmits the communication to the service hub 206. The central core 204 also transmits a control signal to the service hub 206 identifying microwave as being the access technology with which the communication will be transmitted.

The service hub 206 receives the formatted communication and the control signal. In response, the service hub 206 directs the communication to the antenna for transmission via microwave.

It will be appreciated that the network interface 202 may receive or transmit multiple communications using wireline or wireless technologies complying with one or more wireline or wireless standards. In addition, it will be appreciated that the service hub 206 may receive or transmit multiple communications via wireline or wireless technologies complying with one or more wireline or wireless standards.

FIG. 3 depicts an exemplary embodiment of an access device 104B in accordance with the present invention. The access device 104B comprises a network interface 202A, a central core 204A, and a service hub 206A.

The network interface 202A operates similar to the network interface 202 of FIG. 2. However, the network interface 202A of FIG. 3 has a dynamic identifier 302.

The dynamic identifier 302 identifies the access technology of an incoming communication. The dynamic identifier 302 identifies the access media over which a communication is received and whether one or more logical data streams are being received at the network interface 202A. The dynamic identifier 302 transmits a control signal to the central core 204A identifying the access media type and, if needed, the physical access media over which the communication was received, such as wireless spectrum or an xDSL loop.

The central core 204A provides the same functionality as the central core 204 of FIG. 2. Additionally, the central core 204A of FIG. 3 comprises an access protocol formatter 304, a framing formatter 306, a signal formatter 308, a controller 310, and a specification database 312.

The access protocol formatter 304 formats an outgoing communication for a selected access protocol. Additionally, the access protocol formatter 304 removes formatting for a selected protocol from incoming communications so that the incoming communications may be further handled by the central core 204A. For example, the access protocol formatter 304 can format a communication for LAN, WAN, MMDS, PCS, CDMA, FDMA, TDMA, TDD, FDD, Bluetooth, HomeRF or HomePNA standards, and others. The access protocol formatter 304 also may be configured to emulate proprietary MAC protocols and standards, such as DOCSIS 1.0 and 1.1 and wireless DOCSIS.

In some instances, the access protocol formatter 304 transmits a control signal or other message to the controller 310 identifying access protocol information of a received communication. The access protocol formatter 304 also may be configured to process a control signal or other message received from the controller 310 identifying an access protocol format or standard with which to process a communication. In response to the control signal, the access protocol formatter 304 formats the communication accordingly.

The framing formatter 306 formats frames of communications for a selected protocol. The framing formatter 306 formats communications for transmission to a network 110 or a premises device 106 (see FIG. 1). For example, the framing formatter 306 may format a communication for transmission using ATM, IP, HDLC, and other protocols over access media, such as ethernet, SONET, DS0, other digital signal levels and equivalents, and other access media.

The framing formatter 306 also formats received communications for further transmission to another device. For example, the framing formatter 306 may format frames received from the network interface 202A by removing header information to obtain the envelope so that the data in the envelope may be further processed, such as by the signal formatter 308, and further transmitted, such as from the service hub 206A. Similarly, the framing formatter 306 formats communications received via the service hub 206A for a selected protocol so that the communication may be transmitted via the network interface 202A.

In some instances, the framing formatter 306 transmits a control signal or other message to the controller 310 identifying header information or other information. The framing formatter 306 also may be configured to process a control signal or other message received from the controller 310 identifying a framing format or access media with which to process a communication. In response to the control signal, the framing formatter 306 formats the communication accordingly.

The signal formatter 308 formats a communication for a selected signal process. For example, the signal formatter 308 may format a communication using modulation, demodulation, compression, decompression, encryption, and de-encryption. Modulation/demodulation techniques may include QAM, QPSK, OFDM, CAP, and others. The signal formatter 308 may be configured to provide other signal processing techniques, such as analog/digital (A/D) conversion, filtering, coding and decoding, multiplexing and demultiplexing, and generating wave forms. The signal formatter 308 may include a channelizer and/or a multimedia signal processor.

In some instances, the signal formatter 308 transmits a control signal or other message to the controller 310 identifying signal format information or other information. The signal formatter 308 also may be configured to process a control signal or other message received from the controller 310 identifying a signal format with which to process a communication. In response to the control signal, the signal formatter 308 formats the communication accordingly.

The controller 310 controls all of the formatting in the central core 204A. The controller 310 receives any control signals from the network interface 202A and the service hub 206A. In addition, the controller 310 generates any control signals to the network interface 202A or the service hub 206A. For example, the controller 310 will determine over what access media a communication will be transmitted. Thus, the controller 310 may transmit a control signal to the network interface 202A identifying the access media as an ATM VP/VC. Alternately, the controller 310 may transmit a control signal to the service hub 206A identifying a port via which the service hub 206A may transmit a communication as a POTS signal. Other examples exist.

The controller 310 identifies all aspects of the access media over which the network interface 202A and the service hub 206A transmit a communication. Thus, the controller 310 specifies transmission parameters, such as power, transmission rate, and spectrum for wireless communications. Additionally, the controller 310 may identify ports or connections for wireline communications.

Additionally, the controller 310 directs the access protocol formatter 304, the framing formatter 306, and the signal formatter 308 how to format a communication, if any. For example, the controller 310 may transmit a control signal to the access protocol formatter 304 to direct the access protocol formatter 304 to format a communication as a CDMA, TDMA, LAN, WAN, or other communication. Additionally, the controller 310 may transmit a control signal to the framing formatter 306 directing the framing formatter to format a communication as an IP communication, an ATM communication, an ethernet communication, or some other type of communication. Additionally, the controller 310 may transmit a control signal to the signal formatter 308 directing the signal formatter 308 to format a communication using modulation, multiplexing, signal processing, or other signal formatting.

The specifications database 312 comprises a multitude of specifications for wireless and wireline standards and protocols. Each specification for a standard or protocol consists of details on specific formats, communication parameters, processing instructions, control signal and bearer signal characteristics, and other information for the standard and protocol. The specifications database 312 provides specification information to the controller 310 when it receives a control request for such information. This arrangement makes the design efficient in terms of incorporating new protocols and standards or updating the same without impacting any of the other design elements in the central core 204A.

It will be appreciated that the access protocol formatter 304 and the framing formatter 306 may not always operate on a single communication. In some instances, the access protocol formatter 304 will operate on a communication and the framing formatter 306 may not operate on that communication. Similarly, in other instances, the framing formatter 306 may operate on a communication, and the access protocol formatter may not operate on that communication. In either of those instances, the signal formatter 308 may be directed to operate on the communication, or it may not operate on the communication. For example, when the controller 310 determines that a communication will be formatted as a CDMA communication, the signal formatter 308 will be directed to modulate the communication for a CDMA communication. In this instance, the framing formatter 306 will not be used. However, the access protocol formatter 304 will be used to generate the communication as a CDMA communication to the network interface 202A. In another example, the signal formatter 308 may be directed to compress a communication, and the framing formatter 306 may be directed to format the compressed communication as ATM cells in SONET frames.

In one embodiment, the controller 310 is configured to process signaling associated with the communication. The information may be header information, such as in an ATM cell, signaling received to set up a link, or other signaling such as to set up a connection for a wireless communication. Other examples exist.

The service hub 206A operates the same as the service hub 206 of FIG. 2. However, the service hub 206A includes a dynamic identifier 314.

The dynamic identifier 314 dynamically identifies the access technology of communications received from devices, such as the premises device 106 of FIG. 1. For example, the dynamic identifier 314 may determine the access technology to be ATM, IP, another digital access technology, or an analog access technology. Other access technologies exist. The dynamic identifier 314 may be configured to transmit a control signal or other message to the central core 204A identifying the access technology of the received communication.

The system of FIG. 3 operates as follows. In a first example, the network interface 202A receives a communication over an xDSL loop. The dynamic identifier 302 dynamically identifies the communication as being an xDSL communication. The dynamic identifier 302 transmits a message to the central core 204A identifying the communication as an xDSL communication. Additionally, the network interface 202A transmits the communication to the central core 204A.

The controller 310 receives the control signal from the dynamic identifier 302. Additionally, the controller 310 directs the access protocol formatter 304 to receive the xDSL communication.

The access protocol formatter 304 receives the xDSL communication and strips the header information leaving the communication data. The communication data is passed to the signal formatter 308 which then modulates the communication data for transmission as a CDMA communication. The signal formatter 308 transmits the CDMA communication to the service hub 206A. The service hub 206A transmits the CDMA communication via a port to an antenna by which the CDMA communication is transmitted.

In another example, the service hub 206A receives a communication. In this example, the communication is received at the service hub 206A via a WAN connection. The dynamic identifier 314 identifies the communication as being received via a WAN. The dynamic identifier 314 transmits a control signal to the controller 310 and the communication to the central core 204A.

The controller 310 receives the control signal and directs the communication to the access protocol formatter 304. The access protocol formatter 304 strips the header information from the communication so that the data from the communication is left. In this example, the outgoing communication will be formatted as an ATM communication. Thus, the access protocol formatter 304 transmits the data for the communication to the framing formatter 306.

The framing formatter 306 frames the data from the communication as ATM cells. The framing formatter 306 transmits the ATM cells to the network interface 202A. The network interface 202A transmits the ATM cells over VP/VCs.

In this example, the controller 310 transmitted a control signal to the access protocol formatter 304 directing it to strip the header information and to transmit the data to the framing formatter 306. The controller 310 also transmits a control signal to the framing formatter 306 directing it to format the data as ATM cells and to transmit the cells to the network interface 202A. Further, the controller 310 transmits a control signal to the network interface 202A identifying the VP/VC over which to transport the ATM cells.

Those skilled in the art will appreciate that variations from the specific embodiments disclosed above are contemplated by the invention. The invention should not be restricted to the above embodiments, but should be measured by the following claims.

What is claimed is:

1. An access device for facilitating communication between a network and a premises device, the access device comprising:
    a network interface configured to provide access to the network by any of a first plurality of access technologies, wherein the network interface comprises a first identifier configured to identify one of the first plurality of access technologies associated with a first incoming communication from the network;
    a service hub configured to provide access to the premises device by any of a second plurality of access technologies, wherein the service hub comprises a second identifier configured to identify one of the second plurality of access technologies associated with a second incoming communication from the premises device; and
    a central core coupling the network interface with the service hub;
    wherein the central core is configured to receive the first incoming communication and a first indication of the one of the first plurality of access technologies from the network interface, to reformat the first incoming communication to a first outgoing communication employing a second one of the second plurality of access technologies, and transfer the first outgoing communication to the service hub for transmission to the premises device
    wherein the central core is further configured to receive the second incoming communication and a second indication of the one of the second plurality of access technologies from the service hub, to reformat the second incoming communication to a second outgoing communication employing a second one of the first plurality of access technologies, and transfer the second outgoing communication to the network interface for transmission to the network wherein the central core comprises:
    a controller configured to receive the first and second indications and to determine the second one of the first plurality of access technologies and the second one of the second plurality of access technologies;
    a formatter configured to reformat the first and second incoming communications; and
    a database comprising specifications for each of the first plurality of access technologies and each of the second plurality of access technologies;
    wherein the formatter comprises an access protocol formatter, a frame formatter and a signal formatter, and wherein the controller is configured to access the database and process the specifications to control the formatter.

2. The access device of claim 1, wherein:
    the first identifier is configured to identify to the controller a first access medium over which the first incoming communication is received; and the second identifier is configured to identify to the controller a second access medium over which the second incoming communication is received.

3. The access device of claim 1, wherein the formatter comprises an access protocol formatter configured to format the first outgoing communication for a first access protocol selected by the controller, and format the second outgoing communication for a second access protocol selected by the controller.

4. The access device of claim 3, wherein the access protocol formatter is further configured to remove access protocol formatting from each of the first and second incoming communications.

5. The access device of claim 1, wherein the formatter comprises a framing formatter configured to format frames for the first outgoing communication for a first access protocol selected by the controller, and format frames for the second outgoing communication for a second access protocol selected by the controller.

6. The access device of claim 5, wherein the framing formatter is further configured to remove header information from each of the first and second incoming communications.

7. The access device of claim 1, wherein the formatter comprises a signal formatter configured to format each of the first and second incoming communications and each of the first and second outgoing communications according to at least one signal process selected by the controller.

8. The access device of claim 7, wherein the at least one signal process comprises at least one of modulation, demodulation, compression, decompression, encryption and de-encryption.

9. A method for facilitating communication between a network and a premises device, the method comprising:
providing access to the network by any of a first plurality of access technologies;
providing access to the premises device by any of a second plurality of access technologies;
identifying one of the first plurality of access technologies associated with a first incoming communication from the network;
identifying one of the second plurality of access technologies associated with a second incoming communication from the premises device;
accessing a database comprising specifications for each of the first plurality of access technologies and each of the second plurality of access technologies
reformatting the first incoming communication to a first outgoing communication employing a second one of the second plurality of access technologies according to the specifications;
reformatting the second incoming communication to a second outgoing communication employing a second one of the first plurality of access technologies according to the specifications;
transmitting the first outgoing communication to the premises device; and
transmitting the second outgoing communication to the network wherein reformatting for a communication comprises formatting the access protocol and frame according to the signal process of the communication.

10. The method of claim 9, further comprising:
identifying a first access medium over which the first incoming communication is received; and
identifying a second access medium over which the second incoming communication is received.

11. The method of claim 9, wherein:
reformatting the first incoming communication comprises formatting the first outgoing communication for a first access protocol; and
reformatting the second incoming communication comprises formatting the second outgoing communication for a second access protocol.

12. The method of claim 9, wherein:
reformatting the first incoming communication comprises removing access protocol formatting from the first incoming communication; and
reformatting the second incoming communication comprises removing access protocol formatting from the first incoming communication.

13. The method of claim 9, wherein:
reformatting the first incoming communication comprises formatting frames for the first outgoing communication for a first access protocol; and
reformatting the second incoming communication comprises formatting frames for the second outgoing communication for a second access protocol.

14. The method of claim 9, wherein:
reformatting the first incoming communication comprises removing header information from the first incoming communication; and
reformatting the second incoming communication comprises removing header information from the second incoming communication.

15. The method of claim 9, wherein:
reformatting the first incoming communication comprises formatting each of the first incoming communication and the first outgoing communication according to at least one signal process; and
reformatting the second incoming communication comprises formatter each of the second incoming communication and second outgoing communication according to at least one signal process.

16. The method of claim 15, wherein the at least one signal process comprises at least one of modulation, demodulation, compression, decompression, encryption and de-encryption.

* * * * *